(12) United States Patent
Ash et al.

(10) Patent No.: US 9,396,017 B2
(45) Date of Patent: *Jul. 19, 2016

(54) PREFERENTIAL CPU UTILIZATION FOR TASKS

(71) Applicant: INTERNATIONAL BUSINESS MACHINES CORPORATION, Armonk, NY (US)

(72) Inventors: Kevin J. Ash, Tucson, AZ (US); Michael T. Benhase, Tucson, AZ (US); Lokesh M. Gupta, Tucson, AZ (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,271

(22) Filed: Jun. 3, 2015

(65) Prior Publication Data

US 2015/0301862 A1    Oct. 22, 2015

Related U.S. Application Data

(63) Continuation of application No. 14/074,307, filed on Nov. 7, 2013, now Pat. No. 9,063,786, which is a continuation of application No. 13/616,930, filed on Sep. 14, 2012, now Pat. No. 9,058,217.

(51) Int. Cl.
*G06F 9/46* (2006.01)
*G06F 9/50* (2006.01)

(52) U.S. Cl.
CPC ........ *G06F 9/46* (2013.01); *G06F 9/505* (2013.01); *G06F 9/5088* (2013.01)

(58) Field of Classification Search
USPC ........................................................ 718/105
See application file for complete search history.

(56) References Cited

U.S. PATENT DOCUMENTS

| | | | |
|---|---|---|---|
| 5,293,620 A | 3/1994 | Barabash et al. | |
| 5,819,310 A | 10/1998 | Vishlitzky et al. | |
| 7,171,666 B2 | 1/2007 | Ueda | |
| 7,464,380 B1 | 12/2008 | Hempel | |
| 2004/0068730 A1 | 4/2004 | Miller et al. | |
| 2009/0019450 A1 | 1/2009 | Mori et al. | |

*Primary Examiner* — Emerson Puente
*Assistant Examiner* — Steven Do
(74) *Attorney, Agent, or Firm* — Griffiths & Seaton PLLC

(57) ABSTRACT

A set of like tasks to be performed is organized into a first group, and a last used processing group associated with the like tasks is stored. Upon a subsequent dispatch, the last used processing group is compared to other processing groups and the tasks are assigned to a processing group based upon a predetermined threshold.

7 Claims, 3 Drawing Sheets

PREFERENTIAL CPU UTILIZATION FOR TASKS

CROSS REFERENCE TO RELATED APPLICATIONS

This Application is a Continuation of U.S. patent application Ser. No. 14/074,307, filed on Nov. 7, 2013.

FIELD OF THE INVENTION

The present invention relates in general computing systems, and more particularly to, systems and methods for increased data management efficiency in computing storage environments.

DESCRIPTION OF THE RELATED ART

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written. As a result, cache memory structures play an important role in computing systems for overall functioning.

SUMMARY OF THE INVENTION

Various embodiments for data management in a computing storage environment having multiple processor devices, are provided. In one embodiment, by way of example only, a method for data management in a computing storage environment having multiple processor devices is provided. A set of like tasks to be performed is organized into a first group, and a last used processing group associated with the like tasks is stored. Upon a subsequent dispatch, the last used processing group is compared to other processing groups and the tasks are assigned to a processing group based upon a predetermined threshold.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
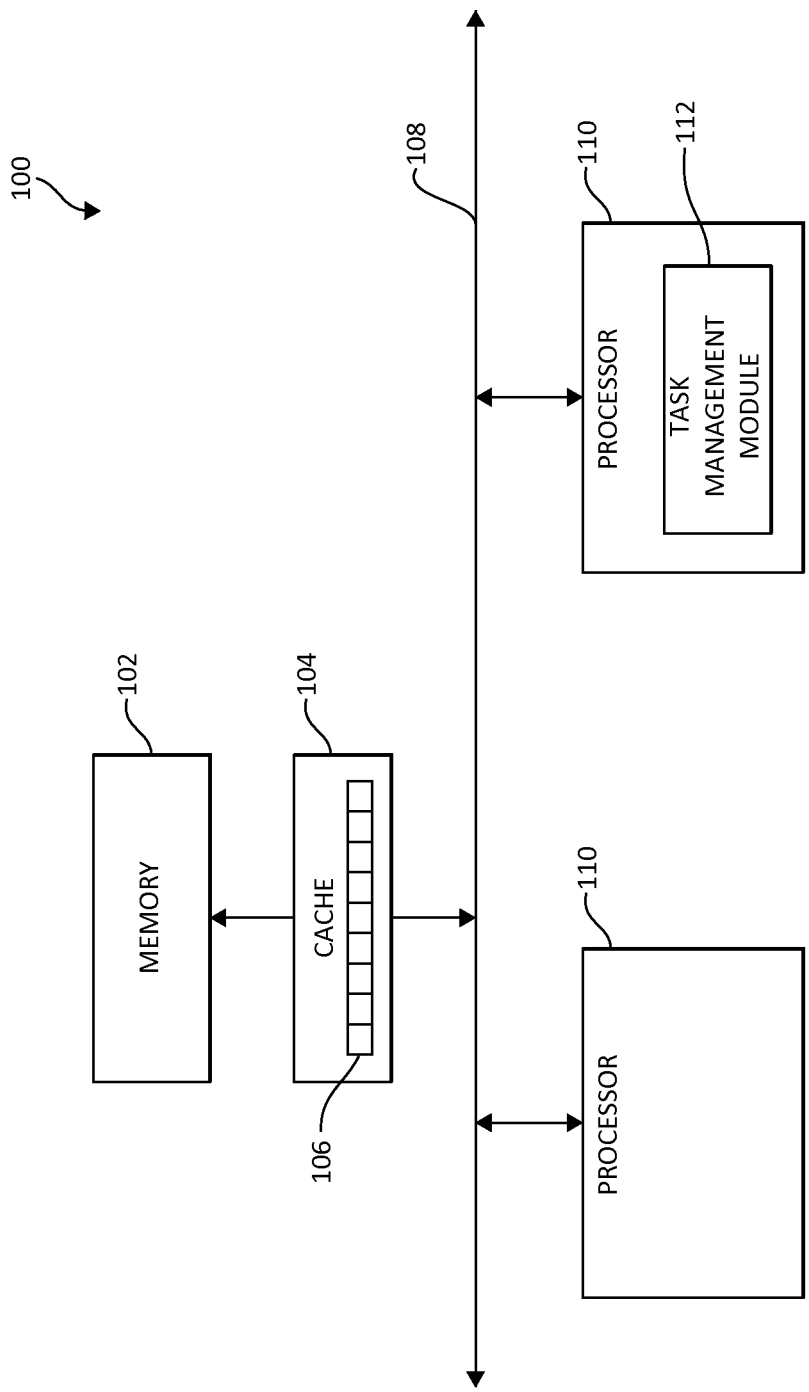
FIG. 1 is an exemplary block diagram showing a hardware structure for cache management in which aspects of the present invention may be realized.

As mentioned previously, storage controller devices in computer storage systems may have their own scheduler for tasks that are running on the Central Processing Units (CPUs) associated with the particular storage controller. Many of these tasks concern the same control blocks (data structures) each time the tasks are dispatched.

In one such computer storage system, for example, these tasks may execute on any of the CPUs. As a result, a particular task fetches its control blocks, and another task fetches data into a single CPU, and the task finishes processing. Then, later on, the task may execute on another CPU, and fetch the same set of control blocks on other Level 1/Level 2 (L1/L2) cache lines. When the control blocks are fetched on another CPU, (1) if the control blocks are being updated, then those control blocks need to be invalidated on the other CPU's cache, and (2), those control blocks will need to be fetched on the new CPU's cache lines. These operations incur expenditure of resources and may impact performance.

One possible solution to address the two requirements discussed previously is to bind the tasks to a group of CPUs that share a set of L1/L2 cache. This solution presents challenges, however, as some CPUs may receive longer dispatch queues since their tasks may be short or fewer in number. As a result, some CPUs will remain idle for certain periods of time, whereas other CPUs may be too busy.

The illustrated embodiments, alternatively, avoid this potential challenge by, for example, (1) keeping a set of tasks running on a certain set of CPUs, and (2) by movement of these tasks to another set of CPUs when a delta between dispatch queues is greater than a predetermined threshold. Accordingly, in one exemplary embodiment, "hit ratios" in cache memory are improved, which corresponds to an overall increase in data management performance in the computing environment.

In one of the illustrated embodiments, the set of tasks described above may include a number of operations executing in a computing storage environment, including such tasks as a Non Volatile Storage (NVS) operation, a data stage operation, a data destage operation, a read operation, a write operation, an Operating System (OS) operation, or a copy operation.

Accordingly, in view of this storage-centric embodiment, groups of tasks (or like type groups) are migrated between CPU groups (which, for example, may share L1/L2/L3 cache, and/or lock acquisition and free hardware resources) while preventing large skew in CPU queue depths. Such queue depths will be further described, following. "Queue depth" represents a useful metric since it reflects both CPU load, and a likelihood of future data/lock residence in, for example, the L1/L2/L3 caches. In other words, the larger the queue depth, the more likely data/locks will age out of L1/L2/L3 before a task gets re-dispatched.

More generally, the mechanisms of the illustrated embodiments initiate CPU groups that share resources, (such as the aforementioned L1/L2/L3 cache). Instead of a conventional implementation where one task dispatch queue is assigned to each CPU, a dispatch queue is assigned on a per-CPU group basis. As a result, when a task is performed on a particular CPU in a select CPU group, the new task is scheduled from the dispatch group corresponding to the select CPU group.

The determination mechanism whereby the group of tasks assigned to a per-CPU group are migrated will be further explained in detail below.

Turning to FIG. 1, a block diagram of one embodiment of a system 100 for task management, incorporating various aspects of the present invention, is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

An additional processor 110 is shown operational in the system 100. Both processors 110 may share resources, such as access to a similar cache level as previously described.

In various embodiments, processor 110 comprises or has access to a task management module 112, which comprises computer-readable code that, when executed by processor 110, causes processor 110 to perform task management operations. In the various embodiments, processor 110 is configured for organizing a set of like tasks to be performed into a first group. Processor 110 is further configured for, upon a determined imbalance between dispatch queue depths greater than a predetermined threshold, reassigning the set of like tasks to an additional group.

In various other embodiments, processor 110 is configured for storing the reassignment of the additional group.

In various other embodiments, processor 110 is configured for performing the aforementioned determining an imbalance between dispatch queue depths pursuant to a task dispatch operation.

In various other embodiments, processor 110 is configured for organizing a number of dispatch queues, each corresponding to one of the first and the additional groups.

In various other embodiments, processor 110 is configured for, pursuant to reassigning the set of like tasks to the additional group, reassigning the set of like tasks to which of the plurality of dispatch queues corresponds to the additional group.

In various other embodiments, processor 110 is further configured for calculating a dispatch queue depth for at least one of the plurality of the dispatch queues for determining the imbalance.

Figure 2:
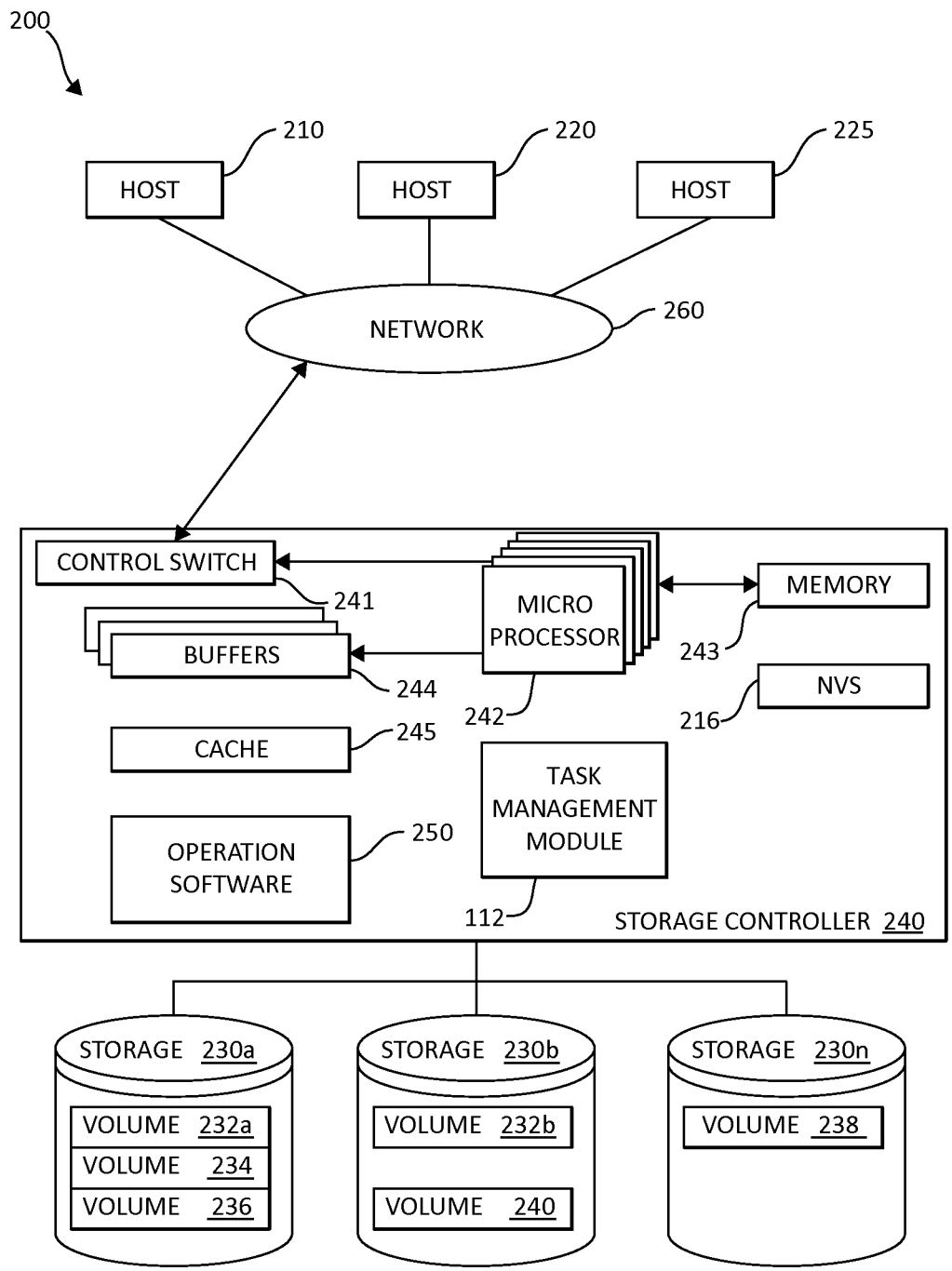
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as one of an available plurality of processing units, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a task management module 112. The task management module 112 may incorporate internal memory (not shown) in which task management algorithms according to aspects of the present invention are stored or otherwise implemented. The task management module 112 may work in conjunction with each and every component of the storage controller 240, the hosts 210, 220, 225, and other storage controllers 240 and hosts 210, 220, and 225 that may be remotely connected via the storage fabric 260. Task management module 112 may be structurally one complete module or may be associated and/or included with other individual modules. Task management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the task management module 112, in which information may be set. The multiple buffers 244 may be implemented to assist with the methods and steps as described herein.

Figure 3:
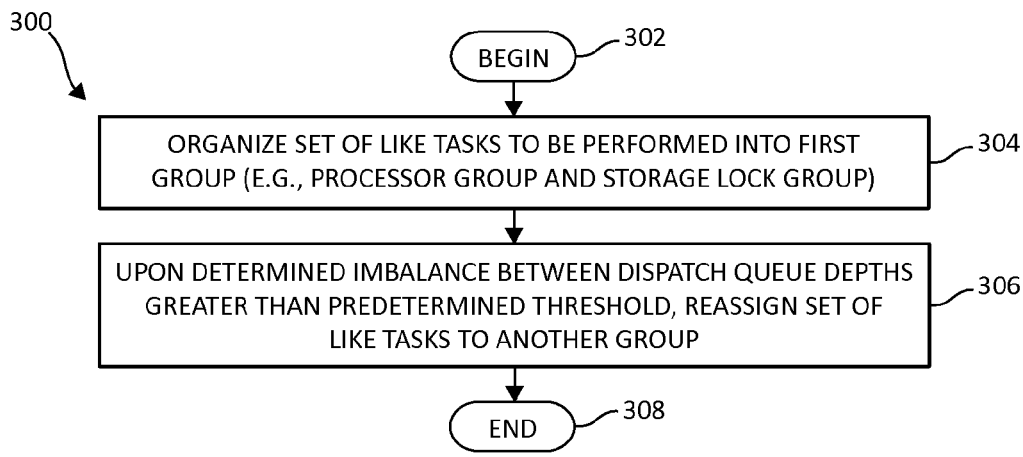
FIG. 3 is a flow chart diagram illustrating an exemplary method for increased efficiency in cache management, again in which aspects of the present invention may be realized.

Turning now to FIG. 3, a flow chart diagram, illustrating an exemplary method 300 for improved data management by selective CPU implementation, is depicted. Method 300 begins (step 302). A set of like tasks to be performed is organized into a first group (step 304). This CPU group may be defined by a number of processors (CPUs) having shared access to resources such as storage lock resources. Accordingly the groups may be referred to CPU groups and/or Storage Lock Groups, for example.

In a following step, upon a determined imbalance between task dispatch queue depths greater than a predetermined threshold, the set of like tasks is reassigned to another group (step 306) as will be further described. The method 300 then ends (step 308).

Figure 4:
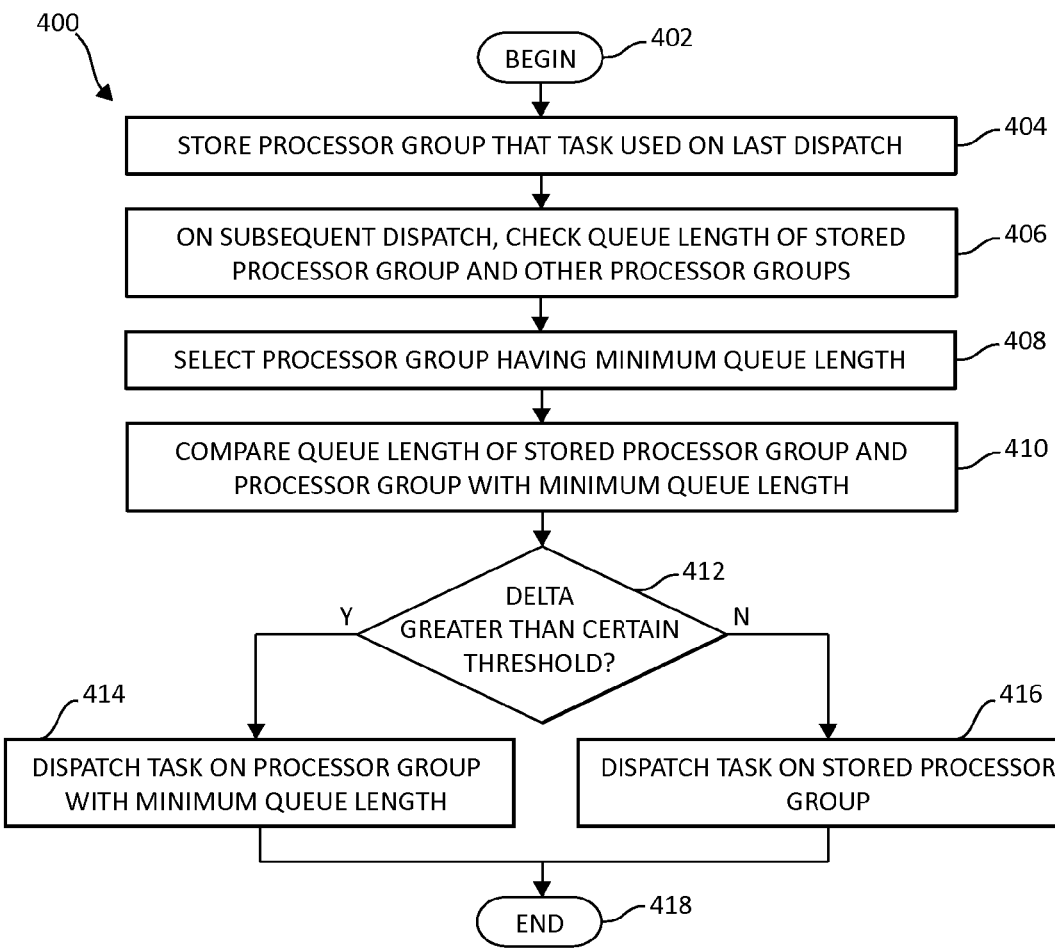
FIG. 4 is an additional flow chart diagram illustrating an exemplary method for dispatching tasks in a computing environment, again in which aspects of the present invention may be implemented.

FIG. 4, following, is an additional flow chart diagram depicting an exemplary method 400 of operation for dispatching tasks in a computing environment in accordance with the present invention. Method 400 begins (step 402) by, for a particular task to be dispatched, storing the CPU group association that the instant task used the last time when it was dispatched (step 404).

In a subsequent dispatch operation for any task, a queue length of the stored CPU group and other CPU groups is compared (step 406). The CPU group having the minimum queue length is selected (step 408). The queue length of the stored CPU group and the CPU group with the minimum queue length is then compared (step 410). If the delta (difference between the queue lengths of the minimum and the stored CPU group) is greater than a certain predefined threshold (step 412), then the task to be dispatched is dispatched on the CPU group having the minimum queue length (step 414).

Alternatively, if the delta is not greater than the threshold (again, step 412), then the task to be dispatched is dispatched on the stored CPU group (step 416). The method 400 then ends (step 418). As one of ordinary skill in the art will appreciate, the threshold queue length may vary according to a particular implementation.

The analysis performed in method 400 previously of comparing queue lengths establishes the metric of "queue depth" for various CPU groups previously described, where upon a major determined imbalance of this metric, the CPU resources for dispatching tasks are reassigned so as to again promote balance in the overall computing environment.

Here again, as previously described, examples of tasks/groups which are operational in a particular computing environment may relate to various specific computing operations—such as the execution of NVS Network Adapter (NA) code on an alternative Central Electronics Complex (CEC) of a clustered computing environment, stage/destage operations (where device adapter data or lock data is shared), read and write operations (here again where Host Adapter (HA) data is shared), OS operations, and copy operations such as Peer-to-Peer Copy operations (PPRC).

One example of the mechanisms of the illustrated embodiments may concern the aforementioned PPRC copy operation. A PPRC Establish operation may be in progress, for example, and the load between CPUs is initially balanced during the Initial Copy. Once the Initial Copy completes (and the associated tasks responsible for that operation are terminated), high skew between CPU groups could result, due to task affinity, as one of ordinary skill in the art will appreciate. Use of the method 400 and other mechanisms of the present invention previously described, however, serves to adjust the load via monitoring CPU queue depths, and minimizes the skew between groups.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A method for data management in a computing storage environment having multiple processor devices, comprising:
   organizing a set of like tasks to be performed into a first group;
   storing a last used processing group associated with the set of like tasks;
      wherein upon a subsequent dispatch, the last used processing group is compared to other processing groups and the tasks are assigned to a processing group based upon a predetermined threshold; and
   reassigning the set of like tasks to an additional group having a minimal queue length upon a determination that the difference between the queue lengths of the additional processing group and the stored processing group is greater than a predetermined threshold.

2. The method of claim 1, further including storing the reassignment of the additional group.

3. The method of claim 1, further including performing the determining pursuant to a task dispatch.

4. The method of claim 1, further including organizing a plurality of dispatch queues, each corresponding to one of the first and the additional groups.

5. The method of claim 4, further including pursuant to reassigning the set of like tasks to the additional group, reassigning the set of like tasks to which of the plurality of dispatch queues corresponds to the additional group.

6. The method of claim 5, further including calculating a dispatch queue depth for at least one of the plurality of the dispatch queues for determining the imbalance.

7. The method of claim 1, wherein the set of like tasks includes a nonvolatile storage (NVS) data management task, a stage task, a destage task, a read task, a write task, an operating system task, and a copy task.

\* \* \* \* \*